United States Patent
Hummel et al.

[11] 3,819,254
[45] June 25, 1974

[54] OPTICAL OBJECTIVE INCLUDING A SELF-CENTERING SLIDE BEARING

[75] Inventors: Lothar Hummel, Gottingen; Fritz Kerl, Waake, both of Germany

[73] Assignee: Isco Optische Werke GmbH, Gottingen, Germany

[22] Filed: Oct. 26, 1972

[21] Appl. No.: 300,882

[52] U.S. Cl............... 350/255, 350/42, 350/78
[51] Int. Cl. .......................................... G02b 7/02
[58] Field of Search....... 308/4 R, 4 A, 26 R; 350/8, 350/78, 42; 35/252, 255, 257

[56] References Cited
UNITED STATES PATENTS

| | | | |
|---|---|---|---|
| 533,325 | 1/1895 | Stevens | 350/78 |
| 2,155,569 | 4/1939 | Trautmann | 350/78 |
| 2,260,712 | 10/1941 | Harrison | 350/257 |
| 2,897,026 | 7/1959 | Haller | 308/26 |
| 3,223,464 | 12/1965 | Hoddy | 308/26 |
| 3,318,642 | 5/1967 | Peterson | 308/72 |
| 3,592,517 | 7/1971 | Harris | 308/26 |
| 3,601,459 | 8/1971 | Cutting | 308/26 |

FOREIGN PATENTS OR APPLICATIONS

| | | | |
|---|---|---|---|
| 7,755 | 6/1895 | Great Britain | 350/42 |
| 700,428 | 12/1930 | France | 308/4 |
| 632,868 | 12/1949 | Great Britain | 308/26 |

*Primary Examiner*—Manuel A. Antonakas
*Assistant Examiner*—R. H. Lazarus
*Attorney, Agent, or Firm*—Karl F. Ross; Herbert Dubno

[57] ABSTRACT

A pair of telescoped tubes, serving as lens carriers for a varifocal objective, are slidably interfitted with the aid of two corrugated annular springs of metal or plastic material lodged in axially spaced peripheral grooves on the inner surface of the outer tube. The springs may be split for better accommodation to varying tolerances between the tube diameters; they can also serve as abutments to limit the relative displacement of the tubes.

7 Claims, 3 Drawing Figures

PATENTED JUN 25 1974 3,819,254

OPTICAL OBJECTIVE INCLUDING A SELF-CENTERING SLIDE BEARING

Our present invention relates to a slide bearing designed to facilitate the relative axial displacement of two coaxial members forming a telescopic assembly, such as the lens carriers of a varifocal objective for photographic or cinematographic cameras and projectors.

In an assembly of this nature, especially when used for optical purposes, the interfitted members must be machined to close tolerances in order to insure their accurate guidance with minimum friction.

The general object of our present invention is to provide means in such an assembly compensating for varied tolerances between the diameters of the confronting peripheral surfaces of the two telescoped members, thereby enabling these members to be manufactured more cheaply (e.g., by molding or casting), with little or no polishing of these surfaces.

A more particular object is to provide a slide bearing for such an assembly which can also double as a stop to limit the relative displacement of the telescoped members.

These objects are realized, in accordance with our present invention, by providing one of the two aforementioned confronting surfaces (i.e., the outer surface of the inner member or the inner surface of the outer member) with at least one annular peripheral groove and preferably with a pair of such grooves, each groove receiving a corrugated annular spring whose corrugations slidably engage the opposite surface of the other member.

Such springs can be made from a variety of materials, including metals and plastics; especially if one or both of the telescoped members are made of synthetic resin, we prefer to use a synthetic elastomer (e.g., polypropylene) for the spring or springs so as to minimize surface wear.

Each spring could be formed as a continuous ring but could also be split, preferably only at one point, so as to be able to accommodate itself more readily to diametrical variations of the surface on which it slidably bears. Thus, the open-ended spring can be so biased as to tend to contract peripherally while expanding radially to the extent permitted by the radial spacing between the bottom of its groove and the engaged surface. An abutment on that surface may come to rest against projecting peaks of the corrugations of the spring to limit the relative axial displacement of the two members in at least one direction.

In the case of an optical objective, which is the field of use primarily contemplated by us for this invention, the inner telescoped member is also tubular in order to serve as a lens carrier. More generally, however, our improved slide bearing can also be utilized with solid inner members.

The above and other features of our invention will be described in detail hereinafter with reference to the accompanying drawing in which.

Figure 1:
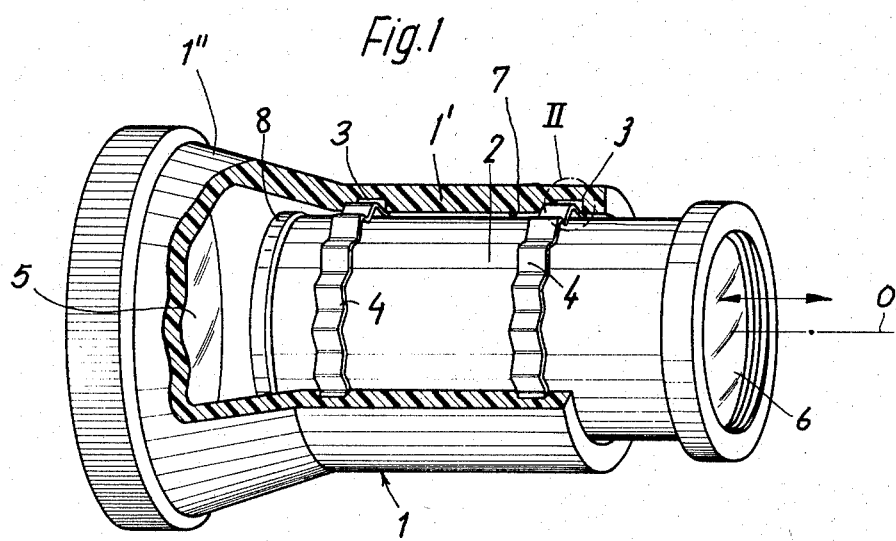
FIG. 1 is a persepctive view (with parts broken away) of a varifocal projection objective embodying our invention.
Figure 2:
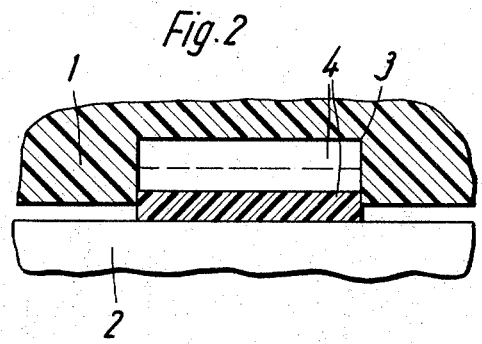
FIG. 2 is an enlarged sectional detail view of the area II of FIG. 1.

The drawing shows a projection objective comprising a tubular housing 1 and a lens barrel 2 slidable therein along their common axis O, each member 1 and 2 carrying one or more lenses 5, 6 which constitute relatively movable components of a varifocal optical system.

In accordance with the present invention, the outer telescoped member 1 is formed along its inner peripheral surface with two axially spaced annular grooves 3 each accommodating a corrugated spring 4 of elastomeric material whose corrugations bear upon the outer surface of member 2. Despite a small clearance 7 between the confronting surfaces of members 1 and 2, the resiliency of the two guide springs 4 keeps the lens barrel 2 well centered within the housing 1. This housing, it will be noted, has a cylindrical rear portion 1' and a frustoconical front portion 1'', the two grooves 3 being disposed near opposite ends of the cylindrical portion. The lens barrel 2 terminates in a shoulder 8 whose height is slightly less than the width of clearance 7 and which therefore comes to rest against the front spring 4 (on the left in FIG. 1) upon maximum rightward retraction of the lens barrel 2 from housing 1.

Figure 3:
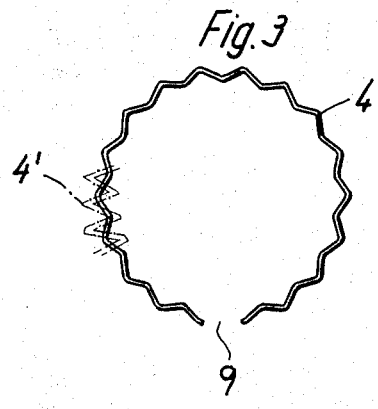
FIG. 3 is an end view of a corrugated spring included in the assembly of FIGS. 1 and 2.

As seen in FIG. 3, each of the springs 4 is split at 9 so as to accommodate different diameters of lens barrel 2 within a considerable tolerance range.

Though the corrugations of springs 4 have been illustrated as triangular in profile, they could also be trapezoidal, rectangular, sinusoidal or otherwise rounded or polygonal.

The two telescoped members 1, 2 may be molded from synthetic resin, as particularly illustrated for outer member 1.

If desired, the spring 4 could also be split into separate segments in which case the associated grooves 3 also need not be continuous. In any event, the spring is so biased that its corrugations tend to steepen (as illustrated in dot-dash lines at 4' in FIG. 3) if unrestrained, thereby automatically centering the lens barrel 2 within the housing 1 and also exerting a certain clamping action upon the lens barrel 2 so as to hold it against spontaneous displacement relative to the housing.

We claim:

1. In an optical objective, in combination, a tubular outer lens carrier, a tubular inner lens carrier coaxially surrounded by said outer lens carrier in telescoped relationship with relative axial slidability and with small clearance between the inner surface of said outer lens carrier, one of said surfaces being provided with a pair of axially spaced annular grooves centered on the common axis of said lens carriers, and a corrugated annular spring lodged in each of said grooves, the corrugations of said spring slidably engaging the other of said surfaces.

2. The combination defined in claim 1 wherein said spring consists of synthetic elastomeric material.

3. The combination defined in claim 1 wherein said spring is split at least at one point and is inherently biased with a tendency to expand radially while contracting peripherally.

4. The combination defined in claim 1, further comprising abutment means rising from said other of said surfaces for limiting the relative sliding motion of said lens carriers.

5. The combination defined in claim 1 wherein said one of said surfaces is the inner surface of said outer lens carrier.

6. The combination defined in claim 5 wherein said outer lens carrier has a cylindrical portion and an adjoining frustoconical portion, said annular grooves being disposed on said cylindrical portion near opposite ends thereof.

7. The combination defined in claim 6 wherein at least one of said lens carriers consists of synthetic resin.

* * * * *